(12) United States Patent
Nguyen et al.

(10) Patent No.: US 9,926,486 B2
(45) Date of Patent: Mar. 27, 2018

(54) SURFACTANT ASSISTED OIL RECOVERY USING ALCOHOL ETHER SULFONATES AND CATIONIC SURFACTANTS

(71) Applicant: Ecolab USA Inc., St. Paul, MN (US)

(72) Inventors: Duy T. Nguyen, Sugar Land, TX (US); Brian L. Mueller, Missouri City, TX (US)

(73) Assignee: Ecolab USA Inc., St. Paul, MN (US)

( * ) Notice: Subject to any disclaimer, the term of this patent is extended or adjusted under 35 U.S.C. 154(b) by 290 days.

(21) Appl. No.: 14/231,307

(22) Filed: Mar. 31, 2014

(65) Prior Publication Data

US 2015/0275634 A1 Oct. 1, 2015

(51) Int. Cl.
| | |
|---|---|
| *E21B 43/16* | (2006.01) |
| *C09K 8/584* | (2006.01) |
| *E21B 43/26* | (2006.01) |
| *C09K 8/60* | (2006.01) |
| *C09K 8/62* | (2006.01) |

(52) U.S. Cl.
CPC .............. *C09K 8/584* (2013.01); *C09K 8/602* (2013.01); *C09K 8/62* (2013.01); *C09K 8/605* (2013.01); *C09K 2208/26* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 4,370,243 A * | 1/1983 | Chen | C09K 8/584 166/270.1 |
| 5,058,678 A | 10/1991 | Dill et al. | |
| 5,104,585 A | 4/1992 | Fabry et al. | |
| 5,318,709 A | 6/1994 | Wuest et al. | |
| 6,333,005 B1 | 12/2001 | Nguyen | |
| 7,629,299 B2 | 12/2009 | Berger et al. | |
| 7,776,798 B2 | 8/2010 | Subramanian et al. | |
| 8,403,044 B2 | 3/2013 | Hutchison et al. | |
| 2004/0127742 A1 | 7/2004 | Anantaneni et al. | |
| 2008/0176772 A1* | 7/2008 | Berger | C09K 8/584 507/255 |
| 2008/0217009 A1 | 9/2008 | Yang | |
| 2008/0302531 A1 | 12/2008 | Berger et al. | |
| 2014/0262297 A1 | 9/2014 | Huang | |

FOREIGN PATENT DOCUMENTS

| | | |
|---|---|---|
| WO | 90/08531 A2 | 8/1990 |
| WO | 2013/162924 A1 | 10/2013 |

OTHER PUBLICATIONS

104th AOCS Annual Meeting & Expo, Apr. 28-May 1, 2013, "Synthesis and Application of High Molecular Weight Surfactants", Presentation by Oil Chem Technologies, 29 pages.
International Search Report and Written Opinion issued for PCT/US2015/022261, dated Jun. 10, 2015, 13 pages.
Supplementary European Search Report issued for EP 15 77 3419, dated Oct. 10, 2017, 2 pages.

* cited by examiner

*Primary Examiner* — Jeffrey Washville
(74) *Attorney, Agent, or Firm* — Senniger Powers LLP

(57) ABSTRACT

A composition comprising an alcohol ether sulfonate and a quaternary ammonium salt is provided for use in methods of increasing recovery of crude oil from a subterranean hydrocarbon-containing formation.

20 Claims, 1 Drawing Sheet

1: Example 1I
2: Example 1N
3: Example 1O
4: Water

1: Example 1I
2: Example 1N
3: Example 1O
4: Water
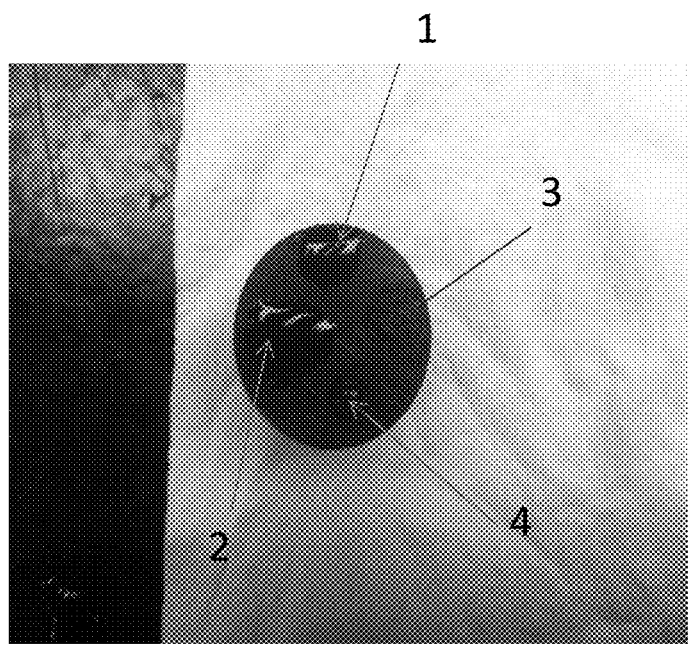

SURFACTANT ASSISTED OIL RECOVERY USING ALCOHOL ETHER SULFONATES AND CATIONIC SURFACTANTS

FIELD OF THE INVENTION

The present invention generally relates to compositions and methods for increased recovery of crude oil from a subterranean hydrocarbon-containing formation. More specifically, the compositions are surfactant combinations comprising an alcohol ether sulfonate and a quaternary ammonium salt.

BACKGROUND OF THE INVENTION

Chemical additives including surfactants have been added to wells in hydraulic fracturing processes to increase recovery of crude oil from subterranean hydrocarbon-containing formations. Hydraulic fracturing can be used to extend the life of an oil well by injecting high volumes of fracturing fluid into the well and pumping the fluid deep into the well at pressures sufficient to create or restore small fractures in the reservoir rock from which oil can be released. The surfactants can act to lower the interfacial tension between the fracturing fluid and the oil trapped within the fractures in the reservoir and can change the wettability of the reservoir rock.

SUMMARY OF THE INVENTION

A composition is provided for increasing recovery of crude oil from a subterranean hydrocarbon-containing formation. The composition comprises an alcohol ether sulfonate and a quaternary ammonium salt. The alcohol ether sulfonate has the formula I:

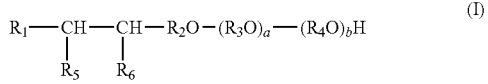

wherein:
R$_1$ is alkyl;
R$_2$ is alkylene;
R$_3$ and R$_4$ are each independently ethylene or propylene;
R$_5$ is hydroxyl and R$_6$ is —SO$_3$M, or R$_5$ is —SO$_3$M and R$_6$ is hydroxyl;
M is independently an alkali metal, an alkaline earth metal, hydronium, NH$_3$ or NH$_2$; and
a and b are each independently an integer from 0 to 30, and a+b equals 1 to 60.

The quaternary ammonium salt has the formula II:

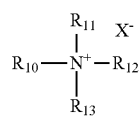

wherein:
R$_{10}$ and R$_{11}$ are independently C$_8$ to C$_{30}$ alkyl;
R$_{12}$ and R$_{13}$ are independently lower alkyl; and
X$^-$ is an anion. The weight ratio of the alcohol ether sulfonate to quaternary ammonium salt ranges from about 40:1 to about 1:1.

A method of increasing recovery of crude oil from a subterranean hydrocarbon-containing formation is also provided. The method comprises injecting the composition described above into a well which is in contact with the subterranean hydrocarbon-containing formation in an amount effective for lowering the interfacial tension between fracturing fluid and oil trapped within the formation and changing the wettability of the subterranean hydrocarbon-containing formation to recover the crude oil from the subterranean hydrocarbon-containing formation.

Another method of increasing recovery of crude oil from a subterranean hydrocarbon-containing formation is provided. The method comprises injecting an alcohol ether sulfonate and a quaternary ammonium salt into a well which is in contact with the subterranean hydrocarbon-containing formation in an amount effective for lowering the interfacial tension between fracturing fluid and oil trapped within the formation and changing the wettability of the subterranean hydrocarbon-containing formation to recover the crude oil from the subterranean hydrocarbon-containing formation. The alcohol ether sulfonate and the quaternary ammonium salt are as described above.

Other objects and features will be in part apparent and in part pointed out hereinafter.

BRIEF DESCRIPTION OF THE DRAWINGS

FIG. 1 illustrates the drop-imbibition test results for drops of surfactants of Examples 1I (drop 1), 1N (drop 2), 1O (drop 3), and water (drop 4).

Corresponding reference characters indicate corresponding parts throughout the drawings.

DESCRIPTION OF THE PREFERRED EMBODIMENTS

It has been discovered that certain combinations of surfactants are more effective in increasing the recovery of crude oil from a subterranean hydrocarbon-containing formation, particularly after hydraulic fracturing, as compared to conventional surfactants used for this purpose.

A composition for increasing recovery of crude oil from a subterranean hydrocarbon-containing formation is provided, the composition comprising an alcohol ether sulfonate and a quaternary ammonium salt, the weight ratio of the alcohol ether sulfonate to quaternary ammonium salt ranging from about 40:1 to about 1:1.

The alcohol ether sulfonate of the composition has formula I:

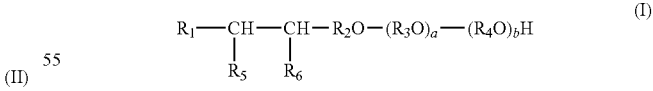

wherein:
R$_1$ is alkyl;
R$_2$ is alkylene;
R$_3$ and R$_4$ are each independently ethylene or propylene;
R$_5$ is hydroxyl and R$_6$ is —SO$_3$M, or R$_5$ is —SO$_3$M and R$_6$ is hydroxyl;
M is independently an alkali metal, an alkaline earth metal, hydronium, NH$_3$ or NH$_2$; and
a and b are each independently an integer from 0 to 30, and a+b equals 1 to 60.

The quaternary ammonium salt of the composition has the formula II:

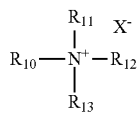

(II)

wherein:
R$_{10}$ and R$_{11}$ are independently C$_8$ to C$_{30}$ alkyl;
R$_{12}$ and R$_{13}$ are independently lower alkyl; and
X$^-$ is an anion.

Preferably, the alcohol ether sulfonate of the composition has the formula III

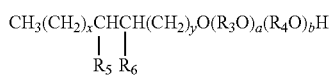

(III)

wherein:
R$_3$ is isopropylene and R$_4$ is ethylene, or R$_3$ is ethylene and R$_4$ is isopropylene;
R$_5$ is hydroxyl and R$_6$ is —SO$_3$M, or R$_5$ is —SO$_3$M and R$_6$ is hydroxyl;
M is independently Na, K, Ca, Mg, hydronium, NH$_3$ or NH$_2$;
x and y are each independently an integer from 0 to 27, and x+y equals 5 to 27; and
a and b are each independently an integer from 0 to 30, and a+b equals 1 to 60.

For the alcohol ether sulfonate of formula I or III, it is preferred that each R$_3$ is isopropylene and R$_4$ is ethylene.

For the alcohol ether sulfonate of formula III, R$_5$ can be hydroxyl and R$_6$ can be —SO$_3$M. Alternatively, R$_5$ can be —SO$_3$M and R$_6$ can be hydroxyl.

For the alcohol ether sulfonate of formula III, x and y each can be independently an integer from 0 to 15, and x+y can be equal to 5 to 15. Preferably, x can be 7 and y can be 8 (i.e., the alcohol portion of the compound is derived from oleyl alcohol).

For the alcohol ether sulfonate of formula I or III, a can be 2 to 25, b can be 2 to 25, and a+b can equal 4 to 50. Alternatively, a is 3 to 20, b is 6 to 20, and a+b equals 9 to 40. As another alternative, a is 5 to 18, b is 10 to 12, and a+b equals 15 to 30. Preferably, a is 18, b is 10, and a+b equals 28.

The alcohol ether sulfonate is preferably water soluble, biodegradable, thermally stable, salt tolerant and/or is manufactured from renewable resources.

Alcohol ether sulfonate surfactants of formula I or III are commercially available from Oil Chem Technologies of Sugar Land, Tex., and can be manufactured by known methods such as those described in U.S. Pat. No. 7,629,299.

For the quaternary ammonium surfactant, R$_{10}$ and R$_{11}$ can be independently C$_8$ to C$_{18}$ alkyl. Preferably, R$_{10}$ and R$_{11}$ are each coco (a mixture of C$_{12}$-C$_{18}$ alkyl).

For the quaternary ammonium surfactant, R$_{12}$ and R$_{13}$ can be independently methyl or ethyl.

X$^-$ of the quaternary ammonium surfactant can be any anion, such as a halide, a sulfate, a nitrate, a nitrite, a carbonate, or a carboxylate.

The quaternary ammonium salt is preferably water dispersible, thermally stable, and/or biodegradable.

Quaternary ammonium salt surfactants of formula II are commercially available from various suppliers including Nalco Champion (Houston, Tex.), Stepan (Northfield, Ill.), and Akzo Nobel Surface Chemistry LLC (Chicago, Ill.).

The weight ratio of the alcohol ether sulfonate to quaternary ammonium salt in the composition can range from about 20:1 to about 1:1, or from about 10:1 to about 1:1. Alternatively, this weight ratio can range from about 20:1 to about 10:1.

The composition can further comprise a carrier, such as a liquid carrier. Preferably, the carrier comprises water, an alcohol, an ether, a glycol, or a combination thereof.

The composition can be provided as a concentrate for dilution prior to use, or in dilute form by incorporating a carrier in the composition.

The composition can also include oil field additives typically used in hydraulic fracturing or post-primary fracturing.

A method is provided for increasing recovery of crude oil from a subterranean hydrocarbon-containing formation. The method comprises injecting the composition into a well which is in contact with the subterranean hydrocarbon-containing formation. The composition is used in an amount effective for lowering the interfacial tension between fracturing fluid and oil trapped within the formation and changing the wettability of the subterranean hydrocarbon-containing formation to recover the crude oil from the subterranean hydrocarbon-containing formation.

The amount of the composition can be effective in changing the wettability of a reservoir from oil-wet to water-wet, or from mixed-wet to water-wet.

The amount of total alcohol ether sulfonate and quaternary ammonium salt surfactants in the composition can range from 0.01 wt. % to 3 wt. % based on the total weight of the composition, The fracturing fluid preferably comprises injection brine. The injection brine can comprise 97 to 99.99% of the fracturing fluid volume.

Another method of increasing recovery of crude oil from a subterranean hydrocarbon-containing formation comprises injecting an alcohol ether sulfonate and a quaternary ammonium salt into a well which is in contact with the subterranean hydrocarbon-containing formation. The alcohol ether sulfonate and quaternary ammonium salt are used in an amount effective for lowering the interfacial tension between fracturing fluid and oil trapped within the formation and changing the wettability of the subterranean hydrocarbon-containing formation to recover the crude oil from the subterranean hydrocarbon-containing formation. The alcohol ether sulfonate has the formula I or III as described herein, and the quaternary ammonium salt has the formula II as described herein.

The alcohol ether sulfonate and the quaternary ammonium salt can be injected sequentially into the well. Alternatively, the alcohol ether sulfonate and the quaternary ammonium salt can be injected into the well simultaneously.

Additional additives typically used in hydraulic fracturing or used post-primary fracturing can be injected into the well, such as a viscosifying agent, a solvent, an alkali, a flow back aid, a non-emulsifier, a friction reducer, a breaker, a cross-linking agent, a biocide, or a proppant (e.g., sand). These additives typically are less than 1% of the fracturing fluid volume.

The subterranean hydrocarbon-containing formation can comprise a sandstone reservoir or a carbonate reservoir.

The injection step of the methods of the invention can occur after hydraulic fracturing of the well.

The injection step of the methods of the invention can occur during hydraulic fracturing of the well.

The methods of the invention are especially useful when the reservoir has ultra-low permeability, low porosity, oil-wet wettability, high temperature, and/or high salinity, and/or when there is a high concentration of divalent cations in the fracturing fluid and produced water.

Unless otherwise indicated, an "alkyl" group as described herein alone or as part of another group is an optionally substituted linear saturated monovalent hydrocarbon radical containing from one to twenty carbon atoms and preferably one to twelve carbon atoms, or an optionally substituted branched saturated monovalent hydrocarbon radical containing three to twenty carbon atoms, and preferably three to eight carbon atoms. The term "lower alkyl" is an optionally substituted linear saturated monovalent hydrocarbon radical containing from one to six carbon atoms, or an optionally substituted branched saturated monovalent hydrocarbon radical containing three to six carbon atoms. Examples of unsubstituted lower alkyl groups include methyl, ethyl, n-propyl, i-propyl, n-butyl, i-butyl, s-butyl, t-butyl, n-pentyl, i-pentyl, s-pentyl, t-pentyl, and the like.

The term "-ene" as used as a suffix as part of another group denotes a bivalent radical in which a hydrogen atom is removed from each of two terminal carbons of the group, or if the group is cyclic, from each of two different carbon atoms in the ring. For example, alkylene denotes a bivalent alkyl group such as ethylene ($-CH_2CH_2-$) or isopropylene ($-CH_2(CH_3)CH_2-$). For clarity, addition of the -ene suffix is not intended to alter the definition of the principal word other than denoting a bivalent radical. Thus, continuing the example above, alkylene denotes an optionally substituted linear saturated bivalent hydrocarbon radical.

Having described the invention in detail, it will be apparent that modifications and variations are possible without departing from the scope of the invention defined in the appended claims.

EXAMPLES

The following non-limiting examples are provided to further illustrate the present invention.

Example 1: Aqueous Stability Test

As an initial stability test, the solubility of surfactant-containing compositions in brines was determined to reduce the possibility of damage to a reservoir in subsequent field testing. This screening test ensures that no solid precipitates when the composition comes into contact with a formation fluid or fracturing fluid. Surfactant-containing compositions were prepared by adding the compositions to Bakken formation brine (27% total dissolved solids (TDS)) to form aqueous mixtures having 0.2% concentration of total surfactant(s). The mixtures were monitored for stability at 90° C. and were observed for precipitation and suspension formation. A mixture that remains visibly clear is considered to have sufficient aqueous stability. The results are reported in Table 1:

TABLE 1

| Ex. | Alcohol Ether Sulfonate (AES) of Formula III | | | | | | | Quaternary Ammonium Salt (QAS) of Formula II | Weight Ratio of AES to QAS | Other Surfactant | Observed Stability Results |
| | x | y | $R_3$ | a | $R_4$ | b | M | | | | |
|---|---|---|---|---|---|---|---|---|---|---|---|
| A | 7 | 8 | isopropylene | 4 | ethylene | 3 | Na | — | — | — | Separated |
| B | 7 | 8 | isopropylene | 8 | ethylene | 3 | Na | — | — | — | Separated |
| C | 7 | 8 | isopropylene | 10 | ethylene | 3 | Na | — | — | — | Separated |
| D | 7 | 8 | isopropylene | 12 | ethylene | 3 | Na | — | — | — | Separated |
| E | 7 | 8 | isopropylene | 18 | ethylene | 2 | Na | — | — | — | Separated |
| F | 7 | 8 | isopropylene | 18 | ethylene | 4 | Na | — | — | — | Separated |
| G | 7 | 8 | isopropylene | 18 | ethylene | 8 | Na | — | — | — | Clear |
| H | 7 | 8 | isopropylene | 18 | ethylene | 8 | Na | — | — | — | Clear |
| I | 7 | 8 | isopropylene | 18 | ethylene | 10 | Na | — | — | — | Clear |
| J | | | | | | | | Lauryltrimethyl ammonium chloride | — | — | Clear |
| K | | | | | | | | — | — | blend of alcohol ether sulfate and ethoxylated alcohol | Separated |
| L | | | | | | | | — | — | ethoxylated alcohol | Clear |
| M | | | | | | | | — | — | $C_{12}$-$C_{14}$ dimethyl amine oxide | Clear |
| N | | | | | | | | Dicocodimethyl ammonium chloride | — | — | Separated |
| O | 7 | 8 | Isopropylene | 18 | Ethylene | 10 | Na | Dicocodimethyl ammonium chloride | 20:1 | — | Clear |
| P | 7 | 8 | Isopropylene | 18 | Ethylene | 10 | Na | Dicocodimethyl ammonium chloride | 10:1 | — | Clear |

Example 2: Spontaneous Imbibition Test

Imbibition cells were immersed into a temperature bath with high temperature adjustment (90° C.). Eagle Ford core plugs were saturated with Bakken oil and stored for 4 days to achieve oil wet status. All the cores were then put into Glass Imbibition Cells with precision graduations in 0.1 mL. The cells were filled with a volume of surfactant solution first, and then immersed into a temperature bath at 90° C. for up to 500 hours (Hr) until no more oil was displaced out. The volume of oil expelled was used to calculate the oil rate and % Original Oil in Place (OOIP) oil recovery. During the spontaneous imbibition process, cores had all faces opened. No confining pressure was added during the process of imbibition. It was assumed that no gas was present in the cores or oil, as they were vacuumed prior to imbibition. Table 2 shows the oil recovery for various surfactants tested in Example 1.

TABLE 2

Oil recovery vs. time using Eagle Ford cores and Bakken oil for 0.2% surfactant(s) in 2% TDS at 90° C.

| | % Oil Recovery | | | | | | | |
|---|---|---|---|---|---|---|---|---|
| Time (Hr) | Ex. 1H | Ex. 1I | Ex. 1J | Ex. 1K | Ex. 1L | Ex. 1M | Ex. 1O | Brine Only |
| 0 | NT | NT | NT | NT | NT | 0 | NT | 0 |
| 65 | 5.21 | 2.41 | 8.22 | NT | NT | NT | 13.89 | NT |
| 89 | 10.42 | 2.41 | 12.33 | NT | NT | NT | 16.21 | NT |
| 113 | 10.42 | 4.81 | 12.33 | NT | NT | NT | 20.84 | NT |
| 137 | 10.42 | 9.63 | 14.39 | NT | NT | NT | 25.47 | NT |
| 233 | 14.32 | 9.63 | 18.50 | NT | NT | NT | 27.78 | NT |
| 241 | 15.63 | 9.63 | 20.56 | NT | NT | NT | 27.78 | NT |
| 257 | 15.63 | 14.44 | 20.56 | NT | NT | NT | 27.78 | NT |
| 281 | 15.63 | 14.44 | 20.56 | 16.99 | 0.51 | 15.12 | 30.10 | 7.61 |
| 385 | 15.63 | 14.44 | 22.61 | NT | NT | NT | 32.42 | NT |
| 437 | 15.63 | 19.25 | 24.67 | NT | NT | NT | 37.05 | NT |
| 457 | 18.23 | 19.25 | 24.67 | NT | NT | NT | 39.36 | NT |
| 481 | 20.83 | 19.25 | 24.67 | NT | NT | NT | 41.68 | NT |
| 628 | 20.83 | 19.25 | 26.72 | NT | NT | NT | 41.68 | NT |

NT = not tested

Dicocodimethyl ammonium chloride (Ex. 1N) was not tested for oil recovery since it was not compatible with the brine, causing phase separation (see Table 1). Ex. 1O, a 20:1 weight ratio of an alcohol ether sulfonate to quaternary ammonium salt surfactant mixture, exhibited the highest oil recovery.

Example 3: Spontaneous Imbibition Test

Imbibition cells were immersed into a temperature bath with high temperature adjustment (90° C.). Eagle Ford core plugs were saturated with Eagle Ford condensate and stored for 20 days to achieve oil wet status. All the cores were then put into Glass Imbibition Cells with precision graduations in 0.1 mL. The cells were filled with a volume of surfactant solution first, and then immersed into a temperature bath at 90° C. or 120° C. for up to 500 hours until no more oil was displaced out. The volume of oil expelled was used to calculate the oil rate and % OOIP oil recovery. During the spontaneous imbibition process, cores had all faces opened. No confining pressure was added during the process of imbibition. It was assumed that no gas was present in the cores or oil, as they were vacuumed prior to imbibition. Table 3 shows the oil recovery for various surfactants tested in Example 1.

TABLE 3

Oil recovery vs. time using Eagle Ford cores and Eagle Ford condensate for 0.2% surfactant(s) in 2% TDS at 90° C.

| | % Oil Recovery | | | | | |
|---|---|---|---|---|---|---|
| Time (Hr) | Ex. 1I | Ex. 1J | Ex. 1O | Ex. 1P | Blend of acrylated imidazoline and alkyldimethyl benzyl ammonium chloride | Brine Only |
| 0 | 0 | 0 | 0 | 0 | 0 | 0 |
| 40 | 24.07 | 4.15 | 18.52 | 22.82 | 23.28 | 10.15 |
| 49 | 26.48 | 8.30 | 20.84 | 25.36 | 23.28 | 15.22 |
| 64 | 28.88 | 12.45 | 23.15 | 32.97 | 27.51 | 17.75 |
| 72 | 33.70 | 12.45 | 23.15 | 35.50 | 27.51 | 20.29 |
| 138 | 40.92 | 14.52 | 30.10 | 58.32 | 29.63 | 30.44 |
| 161 | 43.32 | 16.60 | 30.10 | 60.86 | 29.63 | 30.44 |
| 184 | 43.32 | 16.60 | 32.42 | 63.40 | 31.74 | 30.44 |
| 208 | 45.73 | 16.60 | 32.42 | 63.40 | 31.74 | 30.44 |
| 232 | 45.73 | 16.60 | 32.42 | 63.40 | 31.74 | 30.44 |
| 304 | 48.14 | 16.60 | 34.73 | 63.40 | 33.86 | 30.44 |
| 328 | 48.14 | 16.60 | 34.73 | 63.40 | 35.97 | 30.44 |
| 352 | 48.14 | 18.67 | 34.73 | 63.40 | 35.97 | 30.44 |
| 376 | 48.14 | 20.75 | 34.73 | 63.40 | 35.97 | 30.44 |
| 448 | 48.14 | 20.75 | 34.73 | 63.40 | 35.97 | 30.44 |
| 572 | 48.14 | 22.82 | 34.73 | 63.40 | 38.09 | 30.44 |

Ex. 1P, a 10:1 weight ratio of an alcohol ether sulfonate to quaternary ammonium salt surfactant mixture, exhibited the highest oil recovery.

Example 4: Spontaneous Imbibition Test

Imbibition cells were immersed into a temperature bath with high temperature adjustment (120° C.). Bakken core plugs were saturated with Bakken oil and stored for 4 to 8 weeks to achieve oil wet status. All the cores were then put into Glass Imbibition Cells with precision graduations in 0.1 mL. The cells were filled with a volume of surfactant solution first, and then immersed into a temperature bath at 90° C. or 120° C. for up to 500 hours until no more oil was displaced out. The volume of oil expelled was used to calculate the oil rate and % OOIP oil recovery. During the spontaneous imbibition process, cores had all faces opened. No confining pressure was added during the process of imbibition. It was assumed that no gas was present in the cores or oil, as they were vacuumed prior to imbibition. Table 4 shows the oil recovery for various surfactants tested in Example 1.

TABLE 4

Oil recovery vs. time using Bakken cores and Bakken oil for 0.1% surfactant(s) in 27% TDS at 120° C.

| | % Oil Recovery | |
|---|---|---|
| Time (Hr) | Ex. 1J | Ex. 1O |
| 0.00 | 0.00 | 0.84 |
| 0.50 | 0.00 | 0.84 |
| 1.50 | 0.00 | 2.94 |
| 2.50 | 0.30 | 6.31 |
| 6.50 | 0.30 | 16.82 |
| 17.75 | 0.90 | 31.53 |
| 19.75 | 4.51 | 33.64 |
| 21.75 | 6.02 | 33.64 |
| 23.75 | 6.02 | 33.64 |
| 25.75 | 6.02 | 35.74 |
| 29.75 | 6.02 | 35.74 |
| 46.75 | 6.02 | 37.84 |
| 57.25 | 7.52 | 38.68 |
| 79.25 | 9.02 | 38.68 |
| 81.75 | 10.53 | 38.68 |
| 87.25 | 11.43 | 38.68 |
| 103.75 | 13.54 | 38.68 |
| 107.75 | 13.54 | 39.94 |
| 110.75 | 13.54 | 39.94 |
| 126.75 | 13.54 | 39.94 |
| 132.25 | 15.04 | 41.20 |
| 134.75 | 15.04 | 41.20 |
| 150.75 | 15.04 | 41.20 |
| 159.25 | 15.04 | 41.20 |

TABLE 4-continued

Oil recovery vs. time using Bakken cores and Bakken oil for 0.1% surfactant(s) in 27% TDS at 120° C.

| | % Oil Recovery | |
|---|---|---|
| Time (Hr) | Ex. 1J | Ex. 1O |
| 174.75 | 16.54 | 41.20 |
| 182.75 | 17.45 | 41.20 |
| 200.85 | 18.05 | 41.20 |
| 226.40 | 18.05 | 41.20 |
| 247.75 | 18.05 | 41.20 |
| 254.25 | 18.05 | 41.20 |
| 273.75 | 19.55 | 41.20 |
| 297.75 | 19.55 | 41.20 |
| 319.50 | 19.55 | 41.20 |
| 325.85 | 21.06 | 41.20 |
| 343.50 | 21.06 | 41.20 |
| 372.00 | 22.56 | 42.05 |
| 391.00 | 22.56 | 42.05 |
| 398.00 | 22.56 | 42.05 |
| 415.00 | 24.07 | 42.05 |
| 424.50 | 24.07 | 42.05 |
| 463.00 | 24.07 | 42.05 |

Ex. 1O, a 20:1 weight ratio of an alcohol ether sulfonate to quaternary ammonium salt surfactant mixture, exhibited greater oil recovery than the tested cationic surfactant.

Example 5: Wettability Test

A drop of surfactant solution (0.2%) was placed on the oil-wet core and the imbibition was observed as a function of time. FIG. 1 shows the drop-imibbition results for the surfactants of Example 1I as drop 1, 1N as drop 2 and 1O as drop 3 at 0.2% concentration in high salinity (27% TDS) brine. Neglecting the variations in the size of the drops and roughness of the surface, the imbibition of drop 3 of the composition of Example 1O was complete and quick (i.e. the drop disappeared). The contact angle for drop 3 was visually observed to be close to zero. In contrast, the presence of the Example 1I and 1N drops 1 and 2 were still evident after 15 minutes, suggesting that the combination of surfactants was more effective than the individual surfactants.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and methods without departing from the scope of the invention, it is intended that all matter contained in the above description and shown in the accompanying drawing shall be interpreted as illustrative and not in a limiting sense.

What is claimed is:

1. A method of increasing recovery of crude oil from a subterranean hydrocarbon-containing formation, the method comprising:
    injecting a composition into a well which is in contact with the subterranean hydrocarbon-containing formation in an amount effective for lowering the interfacial tension between fracturing fluid and oil trapped within the formation and changing the wettability of the subterranean hydrocarbon-containing formation to recover the crude oil from the subterranean hydrocarbon-containing formation, the composition comprising:
    an alcohol ether sulfonate having formula I:

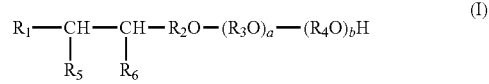

wherein:
    $R_1$ is alkyl;
    $R_2$ is alkylene;
    $R_3$ and $R_4$ are each independently ethylene or propylene;
    $R_5$ is hydroxyl and $R_6$ is —$SO_3M$, or $R_5$ is —$SO_3M$ and $R_6$ is hydroxyl;
    M is independently an alkali metal, an alkaline earth metal, hydronium, $NH_3$ or $NH_2$; and
    a and b are each independently an integer from 0 to 30, and a+b equals 1 to 60; and
    a quaternary ammonium salt having the formula II:

wherein:
    $R_{10}$ and $R_{11}$ are independently $C_8$ to $C_{30}$ alkyl;
    $R_{12}$ and $R_{13}$ are independently lower alkyl; and
    $X^-$ is an anion;
    the weight ratio of the alcohol ether sulfonate to quaternary ammonium salt ranging from about 40:1 to about 1:1.

2. The method of claim 1, wherein the alcohol ether sulfonate has the formula III

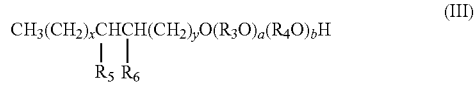

wherein:
    $R_3$ is isopropylene and $R_4$ is ethylene, or $R_3$ is ethylene and $R_4$ is isopropylene;
    $R_5$ is hydroxyl and $R_6$ is —$SO_3M$, or $R_5$ is —$SO_3M$ and $R_6$ is hydroxyl;
    M is independently Na, K, Ca, Mg, hydronium, $NH_3$ or $NH_2$;
    x and y are each independently an integer from 0 to 27, and x+y equals 5 to 27; and
    a and b are each independently an integer from 0 to 30, and a+b equals 1 to 60.

3. The method of claim 1, wherein the alcohol ether sulfonate has the formula III, x and y are each independently an integer from 0 to 15, and x+y equals 5 to 15.

4. The method of claim 3, wherein a is 2 to 25, b is 2 to 25, and a+b equals 4 to 50.

5. The method of claim 3, wherein a is 3 to 20, b is 6 to 20, and a+b equals 9 to 40.

6. The method of claim 3, wherein a is 5 to 18, b is 10 to 12, and a+b equals 15 to 30.

7. The method of claim 1, further comprising injecting a viscosifying agent, a solvent, an alkali, a flow back aid, a non-emulsifier, a friction reducer, a breaker, a crosslinking agent, a biocide, or a proppant into the well.

8. The method of claim 1, wherein the subterranean hydrocarbon-containing formation comprises a sandstone reservoir or a carbonate reservoir.

9. The method of claim 1, wherein $R_{10}$ and $R_{11}$ are independently $C_8$ to $C_{18}$ alkyl and $R_{12}$ and $R_{13}$ are independently methyl or ethyl.

10. The method of claim 1, wherein the weight ratio of the alcohol ether sulfonate to quaternary ammonium salt ranging from about 20:1 to about 1:1.

11. The method of claim 1, further comprising a carrier which comprises water, an alcohol, an ether, a glycol, or a combination thereof.

12. The method of claim 1, wherein the injecting step occurs after hydraulic fracturing of the well.

13. The method of claim 1, wherein the injecting step occurs during hydraulic fracturing of the well.

14. A method of increasing recovery of crude oil from a subterranean hydrocarbon-containing formation, the method comprising:

injecting an alcohol ether sulfonate and a quaternary ammonium salt into a well which is in contact with the subterranean hydrocarbon-containing formation in an amount effective for lowering the interfacial tension between fracturing fluid and oil trapped within the formation and changing the wettability of the subterranean hydrocarbon-containing formation to recover the crude oil from the subterranean hydrocarbon-containing formation, wherein the alcohol ether sulfonate has the formula I:

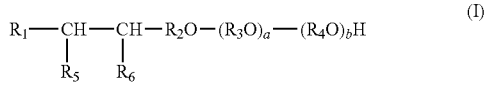
(I)

wherein:
$R_1$ is alkyl;
$R_2$ is alkylene;
$R_3$ and $R_4$ are each independently ethylene or propylene;
$R_5$ is hydroxyl and $R_6$ is —$SO_3M$, or $R_5$ is —$SO_3M$ and $R_6$ is hydroxyl;
M is independently an alkali metal, an alkaline earth metal, hydronium, $NH_3$ or $NH_2$; and
a and b are each independently an integer from 0 to 30, and a+b equals 1 to 60;

the quaternary ammonium salt has the formula II:

(II)

wherein:
$R_{10}$ and $R_{11}$ are independently $C_8$ to $C_{30}$ alkyl;
$R_{12}$ and $R_{13}$ are independently lower alkyl; and
X is an anion; and
the weight ratio of the alcohol ether sulfonate to quaternary ammonium salt ranges from about 40:1 to about 1:1.

15. The method of claim 14, wherein $R_{10}$ and $R_{11}$ are independently $C_8$ to $C_{18}$ alkyl and $R_{12}$ and $R_{13}$ are independently methyl or ethyl.

16. The method of claim 15, wherein $X^-$ is a halide, a sulfate, a nitrate, a nitrite, a carbonate, or a carboxylate.

17. The method of claim 14, wherein the weight ratio of the alcohol ether sulfonate to quaternary ammonium salt ranging from about 20:1 to about 1:1.

18. The method of claim 14, further comprising a carrier which comprises water, an alcohol, an ether, a glycol, or a combination thereof.

19. The method of claim 14, wherein the alcohol ether sulfonate and the quaternary ammonium salt are injected sequentially into the well.

20. The method of claim 14, wherein the alcohol ether sulfonate has the formula III

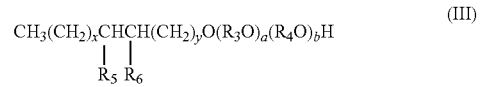
(III)

wherein:
$R_3$ is isopropylene and $R_4$ is ethylene, or $R_3$ is ethylene and $R_4$ is isopropylene;
$R_5$ is hydroxyl and $R_6$ is —$SO_3M$, or $R_5$ is —$SO_3M$ and $R_6$ is hydroxyl;
M is independently Na, K, Ca, Mg, hydronium, $NH_3$ or $NH_2$;
x and y are each independently an integer from 0 to 27, and x+y equals 5 to 27; and
a and b are each independently an integer from 0 to 30, and a+b equals 1 to 60.

* * * * *